US009852392B2

(12) United States Patent
Srinivasan (10) Patent No.: US 9,852,392 B2
(45) Date of Patent: Dec. 26, 2017

(54) 3D MODEL AND BEACON FOR AUTOMATIC DELIVERY OF GOODS

(71) Applicant: Nokia Corporation, Espoo (FI)

(72) Inventor: Arun Srinivasan, San Diego, CA (US)

(73) Assignee: Nokia Technologies Oy, Espoo (FI)

( * ) Notice: Subject to any disclaimer, the term of this patent is extended or adjusted under 35 U.S.C. 154(b) by 805 days.

(21) Appl. No.: 14/193,689

(22) Filed: Feb. 28, 2014

(65) Prior Publication Data

US 2015/0248640 A1  Sep. 3, 2015

(51) Int. Cl.
*G06Q 10/00* (2012.01)
*G06Q 10/08* (2012.01)
*B64C 19/00* (2006.01)

(52) U.S. Cl.
CPC ........ *G06Q 10/08355* (2013.01); *B64C 19/00* (2013.01); *B64C 2201/128* (2013.01)

(58) Field of Classification Search
CPC .... G06Q 10/00; B64C 10/00; B64C 2201/128
See application file for complete search history.

(56) References Cited

U.S. PATENT DOCUMENTS

| 8,930,044 B1* | 1/2015 | Peeters .......................... 701/2 |
| 2009/0009410 A1 | 1/2009 | Dolgin et al. |
| 2009/0058239 A1 | 3/2009 | Kuo et al. |

FOREIGN PATENT DOCUMENTS

WO   WO-2013050850 A1   4/2013

OTHER PUBLICATIONS

Charness, Nina, et al. "Artificial Intelligence in Commodity Hardware Aerial Drones." (2013).
Milgram, Judah, et al. "Autonomous Glider Systems for Logistics Delivery." AUVSI (Associated for Unmanned Vehicle Systems International) 2003 Unmanned Systems Symposium and Exposition, Baltimore Convention Center, Baltimore, Maryland. 2003.

* cited by examiner

*Primary Examiner* — Scott S Trotter
(74) *Attorney, Agent, or Firm* — Mintz Levin Cohn Ferris Glovsky and Popeo, P.C.

(57) ABSTRACT

Methods and apparatus, including computer program products, are provided for drone delivery of products. In one aspect there is provided a method, which may include selecting, at a user equipment, a product; and selecting, by the user equipment, a three-dimensional location where a drone deposits the selected product. Related systems, apparatus, and articles of manufacture are also disclosed.

13 Claims, 7 Drawing Sheets

3D MODEL AND BEACON FOR AUTOMATIC DELIVERY OF GOODS

FIELD

The subject matter described herein relates to mapping and the delivery of goods.

BACKGROUND

A drone, also referred to as unmanned aerial vehicle, is an aircraft that does not have an onboard pilot. Instead, the drone's flight is controlled by a computer autonomously, by a remote pilot, and/or a combination thereof. In the case of autonomous drones, the drones may use mapping data, on board computers/sensors, and the like to fly in an autonomous or semi-autonomous manner to a destination. The remotely piloted drone may employ a data link to allow a pilot to remotely control the drone's flight.

SUMMARY

Methods and apparatus, including computer program products, are provided for drone delivery of products In some example embodiments, there is provided a method. The method may include selecting, at a user equipment, a product; and selecting, by the user equipment, a three-dimensional location where a drone deposits the selected product.

In some variations, one or more of the features disclosed herein including the following features can optionally be included in any feasible combination. The three-dimensional location may include a latitude, a longitude, and a height. The three-dimensional location may include a street address and a height. The user equipment may present a map. An indication may be received, and this indication may represent a selection of a location on the presented map. The selected location may be converted to the three-dimensional location where the drone deposits the selected product.

In some example embodiments, there is provided a method. The method may include receiving, at a user equipment, a request to activate a beacon signal to enable a drone to deliver a product to a three-dimensional location; activating, by the user equipment in response to the request, the beacon to enable the drone to home in on the three-dimensional location; receiving, at the user equipment, an authentication request to confirm at least one of an identity of the user equipment or the three-dimensional location where the drone is scheduled to deposit the product; and sending, by the user equipment in response to the authentication request, a message confirming at least one of the identity of the user equipment or the three-dimensional location.

In some variations, one or more of the features disclosed herein including the following features can optionally be included in any feasible combination. The authentication request may be received via a short message service message and a cellular network.

In some example embodiments, there is provided an apparatus. The apparatus comprising means for selecting a product and means for selecting a three-dimensional location where a drone deposits the selected product.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

The delivery of goods to a destination in a timely and efficient way is a vital part of logistics. Specifically, when an order is placed, a purchaser of the good may expect the purchased good to be timely delivered to the right location. Indeed, Internet-based commerce relies on the timely and accurate delivery of goods. With the advent of drones, a drone may be used to automate the logistics associated with goods delivery.

In some example embodiments, the subject matter disclosed herein may allow selection of a delivery location in three dimensions (3D), delivery via a drone to the selected 3D location, and/or an authentication process between the drone and a destination transceiver prior to product delivery by the drone.

Figure 1:
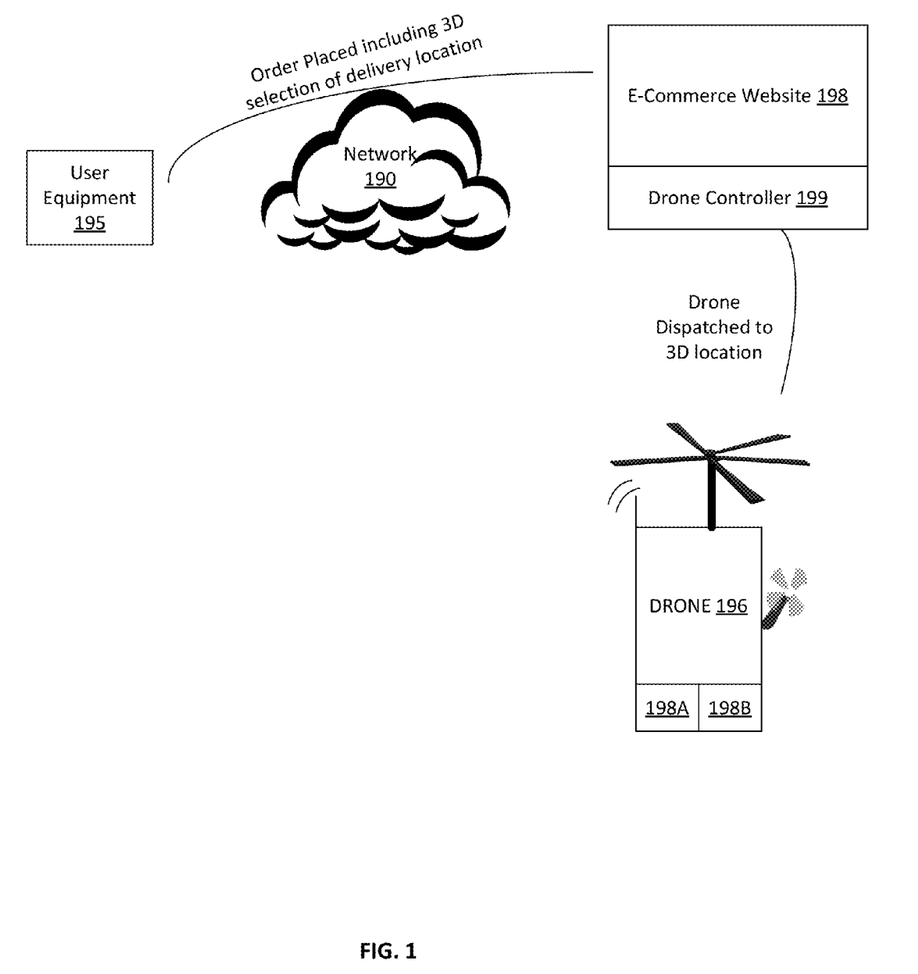
FIG. 1 depicts an example of a system including a drone for product delivery, in accordance with some example embodiments.

FIG. 1 depicts an example system, in accordance with some example embodiments.

User equipment 195 may be used to place a product order via a network 190, such as the Internet, a cellular network, and/or any other network. This order may be placed at a server, such as an e-commerce website 198 providing an e-commerce virtual storefront. During the order process, user equipment 195 may select a location for the delivery of the ordered product. Moreover, user equipment 195 may be given the option of drone delivery. If this option is selected, the location for delivery may be requested in 3D, in accordance with some example embodiments.

Figure 2A:
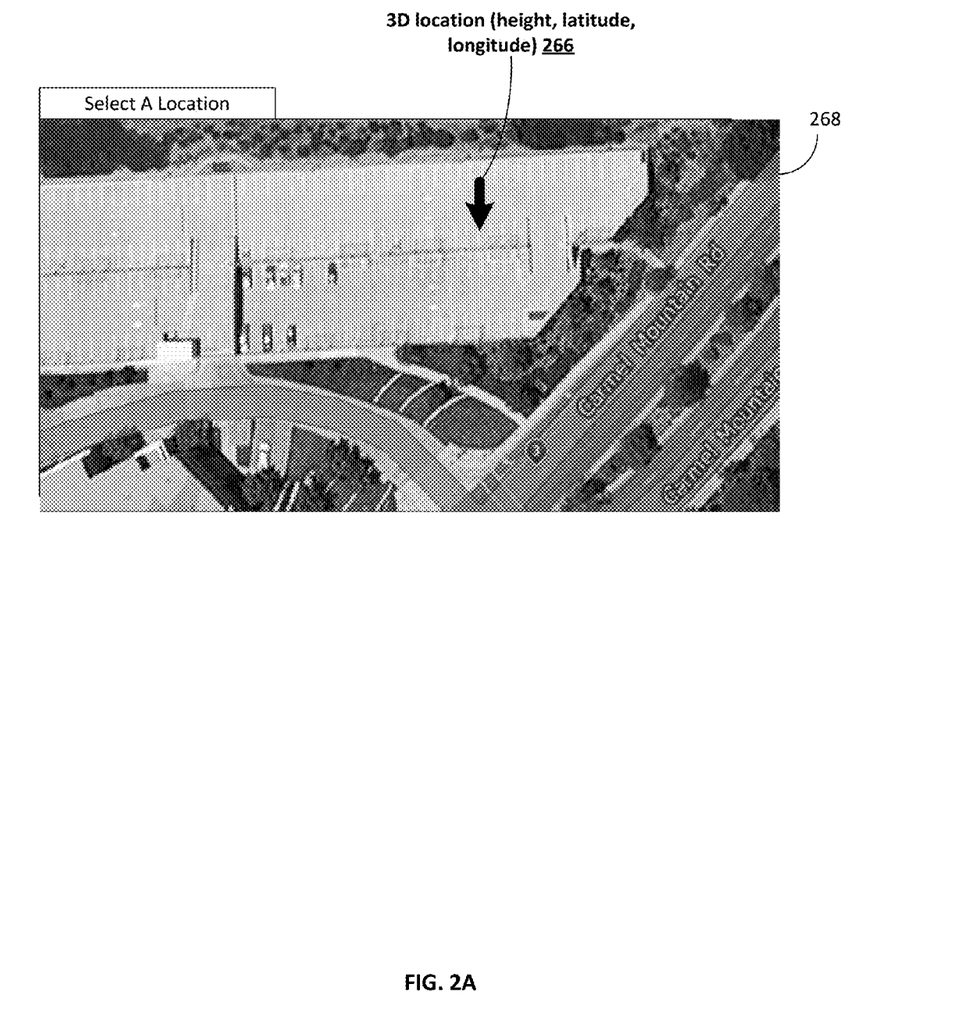
FIG. 2A depicts an example of a location selected in three-dimensions, in accordance with some example embodiments.

FIG. 2A depicts an example of a user interface 268 presented at user equipment 195, in accordance with some example embodiments.

User interface 268 may allow a selection 266 in 3D, in accordance with some example embodiments. In the example of FIG. 2A, the selected location 266 may have a corresponding latitude, longitude, and height to allow a drone to deliver the ordered good to the location selected at 266. In this example, the selected 3D location represents a rooftop of a parking garage, although other locations may be selected as well. Once the 3D location is selected, the selected location as viewed via user interface 268 may be converted (for example, using a model that maps the location into 3D). For example, the point on the map at 268 may be converted into a height, latitude, and longitude or a street address and height, and the like. Once the location is selected, a drone 196, referring also to FIG. 1, may then be dispatched by drone controller 199 to the 3D location selected at 266.

Although FIG. 2A depicts a satellite view of the delivery location, other types of maps may be used as well to allow the 3D location selection.

Referring again to FIG. 1, drone 196 may include one or more bays 198A-B to contain ordered products. For example, the ordered product for user equipment 195 may be placed in bay 198A, while bay 198B may contain a product for another user.

Figure 2B:
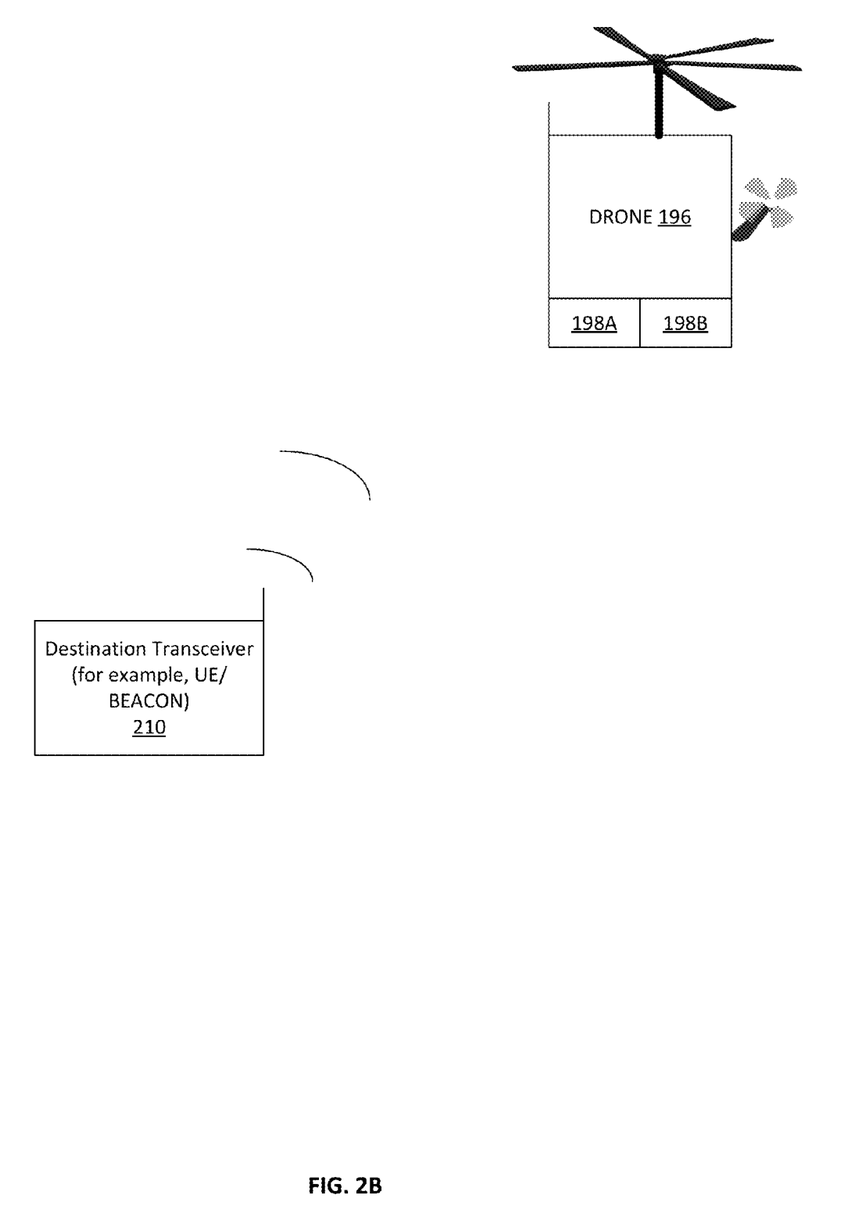
FIGS. 2B-2C depicts an example of a drone delivering a product, in accordance with some example embodiments.

Moreover, in some example embodiments, drone 196 may include a terminal phase. FIG. 2B depicts an example of drone 196 proceeding to the destination location selected at 266. At a given distance from the destination, drone 196 may enter a terminal phase and send an indication to a destination transceiver 210. This destination transceiver 210 may be a user equipment, such as a smartphone, a beacon, an infrared transmitter, an optical transmitter, and/or any other type of radio. For example, when drone 196 is dispatched, drone 196 may navigate from a warehouse to the selected destination 266 using mapping data. When drone 196 is within a certain distance (for example, 100 yards and/or any other distance), drone 196 may send a signal, a page, or a message to activate destination transceiver 210. In response, destination transceiver 210 may then activate a transmitter, such as a beacon to allow the drone 196 to home in on the transmitted signal and thus the destination location for the product to be delivered. The transmitted signal from transceiver 210 may serve as a beacon at the destination and thus provide location and navigation assistance to the drone's mapping data.

In some example embodiments, the transmitted transceiver 210 signal used as a beacon may be in any portion of the spectrum, such as the radio, optical, infrared (IR), and the like.

Moreover, destination transceiver 210 may operate as a dedicated beacon to provide location assistance to drone 196. Alternatively or additionally, destination transceiver 210 may be implemented as a more general-purpose transceiver, such as a cell phone, a smartphone, a tablet, and the like. In addition, in the case of a multi-mode wireless device/phone, the drone 196 may activate a radio frequency transceiver, an IR transceiver, and/or any other transceiver at the multi-mode wireless device/phone.

Furthermore, in some example embodiments, drone 196 may seek authentication from destination transceiver 210 before product delivery. For example, as drone 196 approaches the destination indicated by the destination transceiver 210, drone 196 may request destination transceiver 210 to authenticate itself. This authentication may be a simple password. Alternatively or additionally, the authentication may be implemented using public and private key pairs at the drone 196 and destination transceiver 210.

When the destination transceiver 210 is implemented as a cellular phone, such as a smartphone and the like, the authentication provided by the cellular system itself may be used. For example, drone 196 and destination transceiver 210 may authenticate via a cellular network/base station (for example, using public keys and private secret keys stored in a subscriber identity module or other secure storage module). When this is the case, drone 196 may send a short message service (SMS) text to destination transceiver 210, and a response to the request, destination transceiver 210 may respond and thus authenticate the destination transceiver 210. Moreover, the response by the destination transceiver 210 may also include a password. If the drone 196 determines that the authentication and/or password provided by destination transceiver 210 are correct, the drone 196 may proceed with product delivery at the destination. Although the previous example referred to SMS text, other types of messaging may be used as well.

Figure 2C:
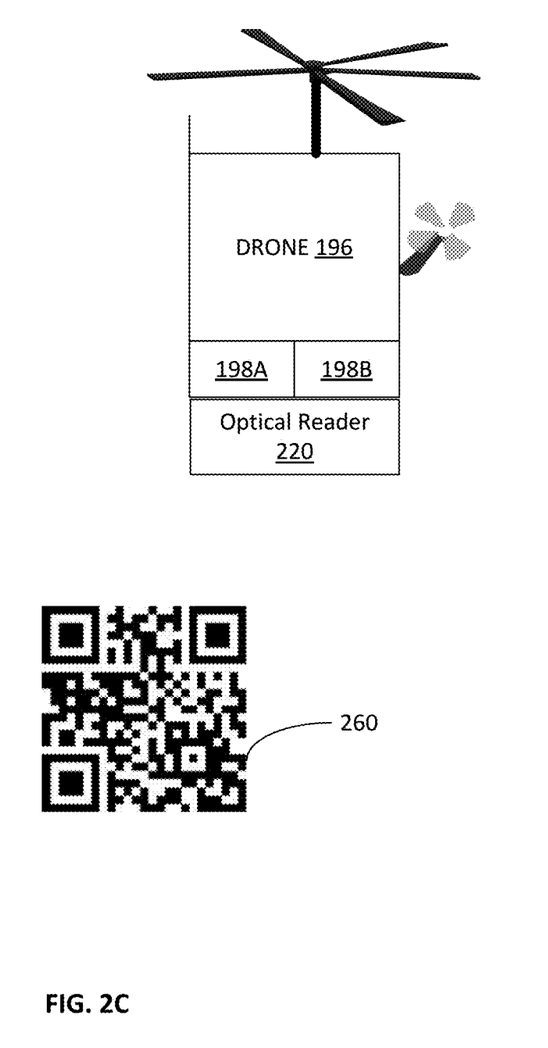

FIG. 2C depicts the use of a machine-readable code, in accordance with some example embodiments. For example, drone 196 may include an optical reader, such as a bar code reader 220, to search for a certain bar code 260 to authenticate the destination location. Once found, drone 196 may deliver the good to the destination location indicated by bar code 260. To illustrate further, bar code 260 may be printed on a rooftop (such as the rooftop at selected location 266) to allow drone 196 to deliver the product to the location/bar code 260. Alternatively or additionally, bar code 260 may be presented by the destination transceiver 210 (for example, on a user interface/display of transceiver 210).

Figure 3:
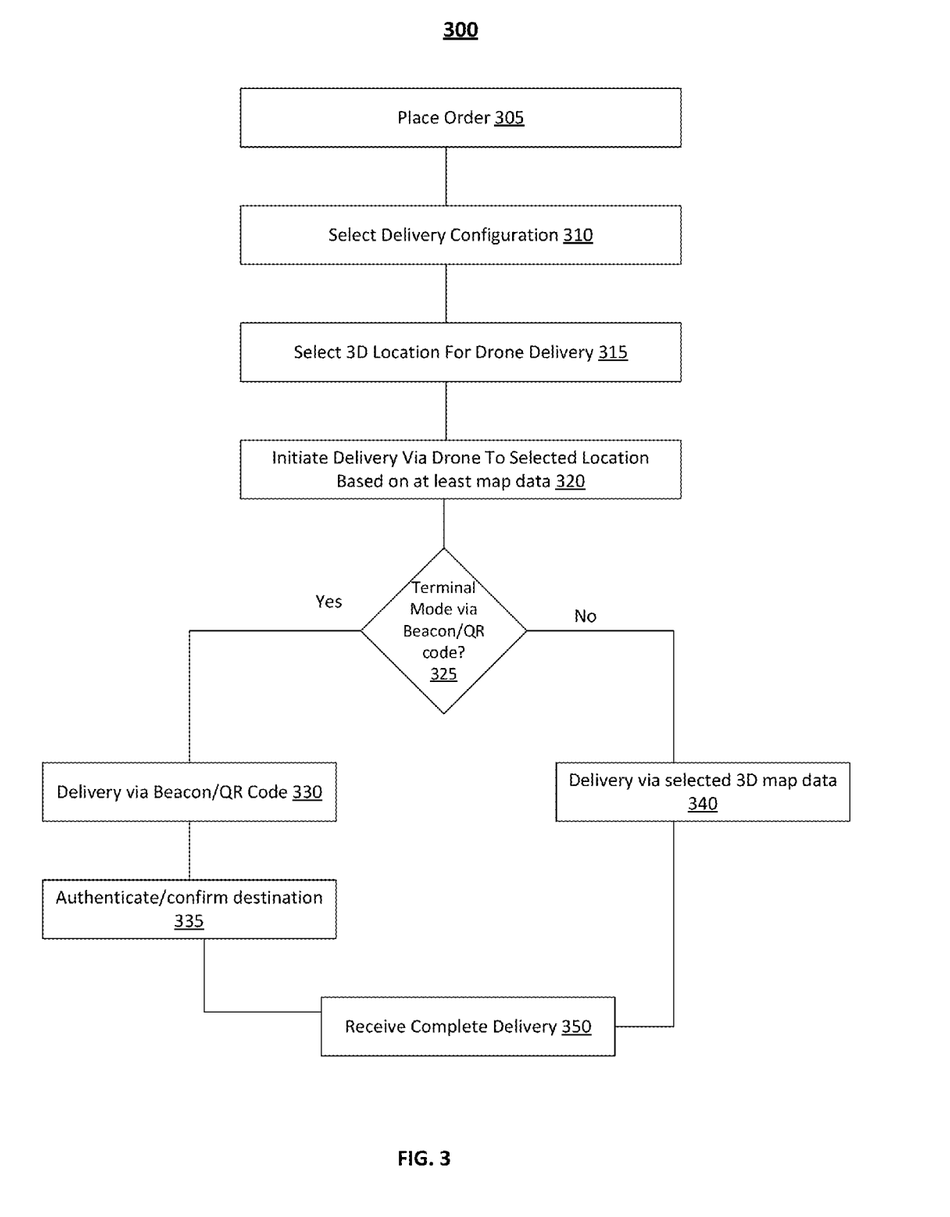
FIG. 3 depicts an example of a process for delivering products via a drone, in accordance with some example embodiments.

FIG. 3 depicts an example process 300 for product delivery using drones, in accordance with some example embodiments. The description of process 300 also refers to FIGS. 1, 2A, 2B, and 2C.

At 305, an order may be placed for a product, in accordance with some example embodiments. For example, a user may access user equipment, such as a smart phone, a tablet, and/or any other computing device, to place (via a user interface at the user equipment) an order for a product, available via e-commerce website 198. The order placement may be by an end-consumer placing an order over the Internet, cellular network, or combination thereof. Alternatively or additionally, the order placement may be by a retailer's point-of-sale system to a backend server, such as e-commerce website 199. As part of the order placement, quantity of goods, payment information, and/or terms of delivery, and any other information may be provided by user equipment 195 to e-commerce website 198.

At 310, a delivery configuration may be selected, in accordance with some example embodiments. For example, a user interface at user equipment may be used to provide additional information to the e-commerce website 199 and, in particular, delivery information. In some example embodiments, the user interface at user equipment 195 may allow a selection of whether drone delivery may be used to deliver the ordered product. Moreover, this user interface may also allow a selection of whether the product can be delivered with (or without) authentication and/or delivery confirmation (as described further below at 335), whether a password is to be used during authentication and/or delivery confirmation, an identity of a beacon transceiver (for example, phone number and any other identifier), and the like.

At 315, a 3D location may also be selected, in accordance with some example embodiments. For example, the user interface of user equipment 195 may select a delivery location in 3D, in accordance with some example embodiments. Referring to FIG. 2A, user equipment 268 may present a map at which a selection 266 of 3D location may be performed (for example, by moving a cursor to the desired delivery location). The selected location may then be converted to a 3D delivery location, such as a latitude, a longitude, and a height (or a street address including height).

At 320, delivery may be initiated via drone to the selected 3D location based on map data and the selected 3D location, in accordance with some example embodiments. For example, the e-commerce website 198 may send the order information, such as ordered product, 3D delivery location, expected delivery time and the like, to a logistics management system that may include drone controller 199, which dispatches the ordered product to the 3D location.

When the drone approaches a certain distance to the selected location, the drone may proceed with the delivery based on a beacon and/or machine-readable code, in accordance with some example embodiments (yes at 325, and 330). In some example embodiments, delivery may include authentication and/or use of a beacon signal, and these delivery options may be selected by the user interface and/or e-commerce website 198.

When the beacon is used, drone 196 may, at a certain distance from the destination, enter a terminal phase and send an indication, such as a page, a message, a call, and/or any other indication to destination transceiver 210 depicted at FIG. 2B. In response, destination transceiver 210 may then activate a transmitter and respond with a beacon signal, a message, a call and/or any other response.

When a machine-readable code is used as shown at FIG. 2C, drone 196 including an optical reader 220 may scan for bar code 260 to identify and/or authenticate the terminal location as well. The transmitted beacon signal and/or machine-readable/bar may be used by drone 196 (along with mapping and navigation data) to identify and thus home in on the 3D delivery location.

At 335, an authentication and/or delivery confirmation may be performed, in accordance with some example embodiments. Moreover, the authentication may be performed during the final terminal phase of flight/delivery. Terminal phase may refer to a distance that is within visual or radio line-of-sight, although any other distance may be used as well. For example, the drone 196 may, in some example embodiments, perform when in terminal phase an authentication with the destination transceiver 210 before delivery of the product. The authentication may be performed by a password. For example, the destination transceiver provides a password or code to the drone 196 and/or e-commerce website, although other forms of authentication may be used as well. The password may be carried by the beacon signal transmitted by destination transceiver 210. The password may be provided in other ways as well including messaging (for example, an SMS text or email to drone 196 and/or any other server).

In some example embodiments, drone 196 and/or e-commerce website may, during the terminal phase of delivery, confirm the delivery location as well. For example, destination transceiver 296 may receive a request to confirm the delivery location. At that time, the destination transceiver 296 may confirm the location or provide an alternate location.

If the drone 196 does not implement a beacon or a machine-readable code, drone 196 may proceed to the destination location based on the selected 3D location, in accordance with some example embodiments (no at 325, and 340).

At 350, a delivery confirmation may be received in accordance with some example embodiments. For example, after the product is delivered, drone 196 and/or e-commerce website 198 may send a confirmation to the entity ordering the product to confirm successful receipt of the ordered product.

Figure 4:
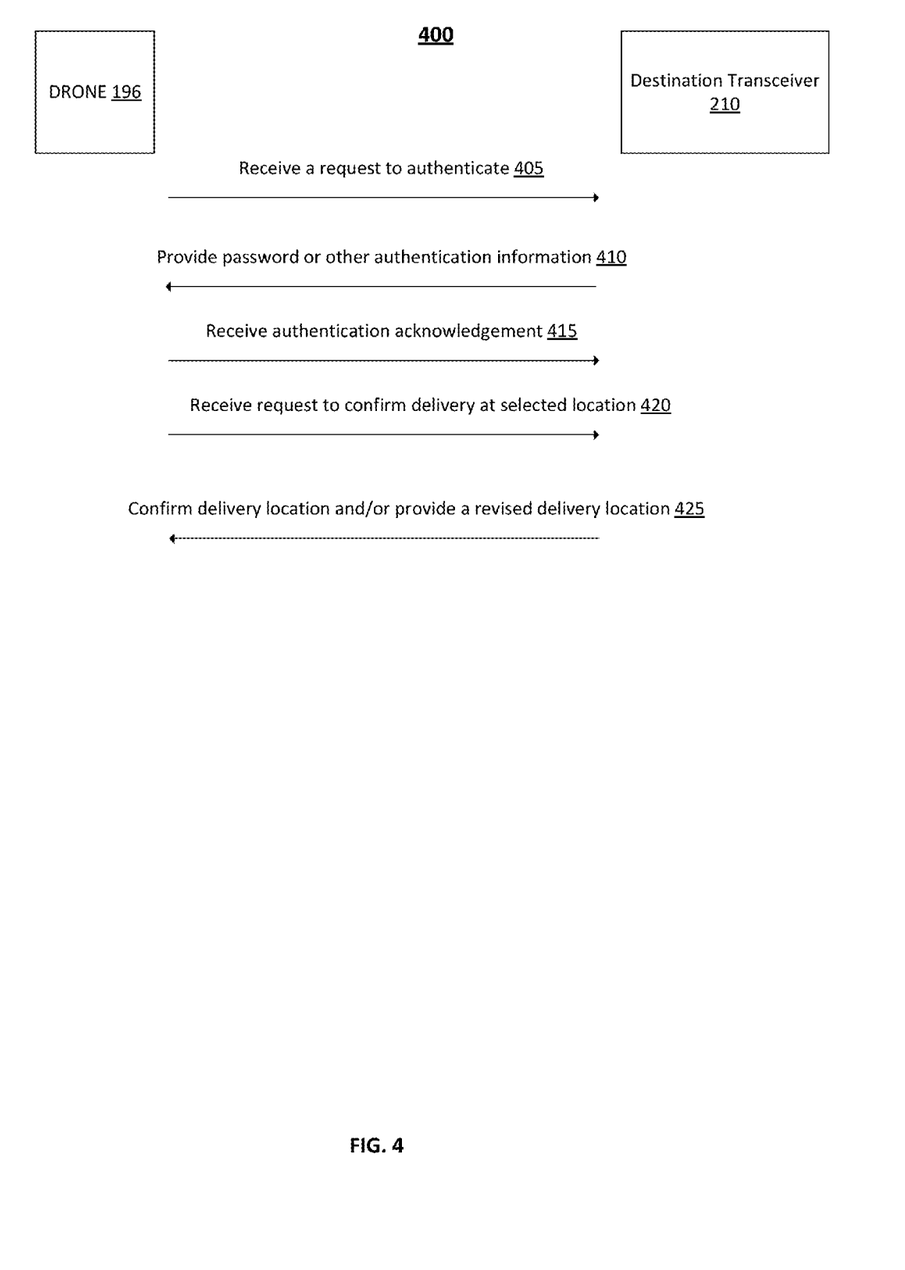
FIG. 4 depicts an example of an authentication process for delivering products via a drone, in accordance with some example embodiments.

FIG. 4 depicts an example process 400 used between the drone and the destination transceiver for authentication, in accordance with some example embodiments.

At 405, a destination transceiver 405 may receive a request to authenticate, in accordance with some example embodiments. For example, drone 196 and/or another processor, such as e-commerce website, may send a request to the destination transceiver 210 to authenticate. This request may be sent during the terminal phase of flight as the drone approaches the destination transceiver 210, although the request may be sent at other times as well At 410, destination transceiver may authenticate and/or provide a password, in accordance with some example embodiments. For example, destination transceiver 210 may authentication in response to the request. The authentication may be implemented as a code or a password carried by the signal transmitted by the destination transceiver 210. In some example embodiments, the authentication may be performed via SMS, although other types of messaging may be used as well. Specifically, drone 196 and/or another processor may send a text to the destination transceiver 210, which responds to the text with a required response in order to authenticate. Alternatively or additionally, other forms of authentication including public-key encryption (for example, using a public key and private/secret keys).

At 415, the authentication may be acknowledged, in accordance with some example embodiments. For example, the drone 196 and/or another processor may send a message to acknowledge that the destination transceiver 210 is authenticated.

At 420, the drone may request a final confirmation of the delivery location, in accordance with some example embodiments. For example, drone 196 and/or another processor may, after authentication, send a message to request confirmation of the delivery location at the 3D location. In response to 420, the destination transceiver 210 may confirm the delivery and the location (or revise the delivery location), in accordance with some example embodiments.

Although process 400 depicts signaling between drone 196 and destination transceiver 210, one or more of the messages may be between a proxy for the drone and the destination transceiver 210. For example, in some example embodiments, some of the messages may be routed to another server, such as e-commerce server 198 that responds on behalf of the drone 196, which may enhance the security of the drone 196 and may reduce possible tampering with, or hacking into, drone 196 by local devices including destination transceiver 210.

In some example embodiments, an apparatus may be implemented comprising means for performing a method according to at least one of the processes described herein.

In some example embodiments, an apparatus may be implemented comprising means for performing a method according to at least one of the processes shown in FIG. 3 or FIG. 4.

In some example embodiments, drone 196 may be implemented as a remotely piloted aircraft, although the drone may be a wheeled motor vehicle (for example, a car, truck, and the like) as well. Moreover, drone 196 may include autonomous and/or semi-autonomous (i.e., with some pilot/user intervention) guidance and navigation system to enable flight/movement from a source to the destination location.

Figure 5:
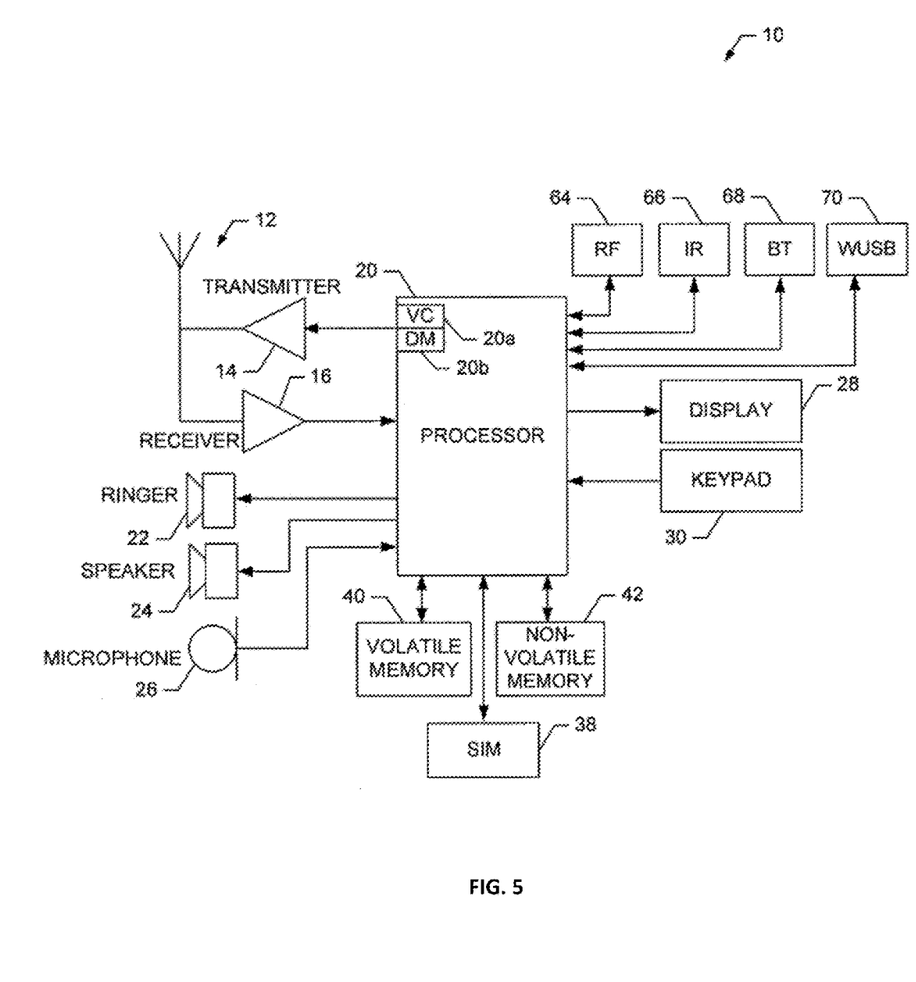
FIG. 5 depicts an example of a user equipment, in accordance with some example embodiments.

FIG. 5 illustrates a block diagram of transceiver 10, in accordance with some example embodiments. In the example of FIG. 5, the transceiver 10 (or portions thereof) may be implemented to provide destination transceiver 210 and/or a transceiver at drone 196. In some example embodiments, the destination transceiver 210 may comprise a user equipment, such as a smart phone, a smart object, a mobile station, a mobile unit, a subscriber station, a wireless terminal, a tablet, a wireless plug-in accessory, and the like.

The apparatus 10 may include at least one antenna 12 in communication with a transmitter 14 and a receiver 16. Alternatively transmit and receive antennas may be separate.

The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 5 as a single processor, in some example embodiments the processor 20 may comprise a plurality of processors or processing cores.

Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, and/or the like. In addition, these signals may include speech data, user generated data, user requested data, and/or the like.

The apparatus 10 may be capable of operating with one or more air interface standards, communication protocols, modulation types, access types, and/or the like. For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20a, an internal data modem (DM) 20b, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 5, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth (BT) transceiver 68 operating using Bluetooth wireless technology, a wireless universal serial bus (USB) transceiver 70, a Bluetooth Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like. In some example embodiments, one or more of the transceivers 64, 66, and the like may be used to provide a beacon signal for drone 196.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing destination transceiver functions and/or drone radio functions including processes 300 and/or 400. The memories may comprise an identifier, such as an international mobile equipment identification (IMEI) code, capable of uniquely identifying apparatus 10. The functions may include one or more of the operations disclosed with respect to processes 300 and/or 400.

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiment, the application logic, software or an instruction set is maintained on any one of various conventional computer-readable media. In the context of this document, a "computer-readable medium" may be any non-transitory media that can contain, store, communicate, propagate or transport the instructions for use by or in connection with an instruction execution system, apparatus, or device, such as a computer or data processor circuitry, with examples depicted at FIG. 5, computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein is accurate delivery of goods in three-dimensions.

If desired, the different functions discussed herein may be performed in a different order and/or concurrently with each other. Furthermore, if desired, one or more of the above-described functions may be optional or may be combined. Although various aspects of the invention are set out in the independent claims, other aspects of the invention comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of the present invention as defined in the appended claims. Other embodiments may be within the scope of the following claims. The term "based on" includes "based on at least." The use of the phase "such as" means "such as for example" unless otherwise indicated.

What is claimed:

1. A method comprising:
   selecting, at a first user equipment, a product;
   selecting, by the first user equipment, a three-dimensional location where a drone deposits the selected product; and
   initiating delivery of the selected product to the three-dimensional location after receipt of a message indicative of an authentication requiring a machine readable bar code displayed on a second user equipment located at the three-dimensional location where the drone is to deposit the selected product after the bar code displayed on the second user equipment is read.

2. The method of claim 1, wherein the three-dimensional location further includes a latitude, a longitude, and a height.

3. The method of claim 1, wherein the three-dimensional location further includes a street address and a height.

4. The method of claim 1, wherein the selecting the three-dimensional location further comprises:
   presenting, at the first user equipment, a map.

5. The method of claim 4 further comprising:
   receiving an indication of the selection of the location on the presented map.

6. The method of claim 5 further comprising:
   converting the selected location to the three-dimensional location where the drone deposits the selected product.

7. An apparatus, comprising:
   at least one processor; and
   at least one memory including computer program code, the at least one memory and the computer program code configured to, with the at least one processor, cause the apparatus to at least:
   select a product;
   select a three-dimensional location where a drone deposits the selected product; and
   initiate delivery of the selected product to the three-dimensional location after receipt of a message indicative of an authentication requiring a machine readable bar code displayed on a second user equipment located at the three-dimensional location where the drone is to deposit the selected product after the bar code displayed on the second user equipment is read.

8. The apparatus of claim 7, wherein the three-dimensional location further includes a latitude, a longitude, and a height.

9. The apparatus of claim 7, wherein the three-dimensional location further includes a street address and a height.

10. The apparatus of claim 7, wherein the selection of the three-dimensional location further includes presentation of the map.

11. The apparatus of claim 10, wherein the apparatus is further configured to at least receive an indication of the selection of the location on the presented map.

12. The apparatus of claim 11, wherein the apparatus is further configured to at least convert the selected location to the three-dimensional location where the drone deposits the selected product.

13. A non-transitory computer-readable medium including computer program code which when executed by at least one processor causes operations comprising:
   selecting a product;
   selecting a three-dimensional location where a drone deposits the selected product; and
initiating delivery of the selected product to the three-dimensional location after receipt of a message indicative of an authentication requiring a machine readable bar code displayed on a second user equipment located at the three-dimensional location where the drone is to deposit the selected product after the bar code displayed on the second user equipment is read.

* * * * *